United States Patent
Blemel et al.

(10) Patent No.: US 9,413,155 B2
(45) Date of Patent: Aug. 9, 2016

(54) SYSTEM TO PROTECT FROM UNSAFE CONDITIONS IN AN ELECTRICAL POWER SYSTEM

(71) Applicants: Kenneth Gerald Blemel, Albuquerque, NM (US); Francis Edward Peter, Albuquerque, NM (US); Kenneth Dominick Blemel, Albuquerque, NM (US); Peter Andrew Blemel, Albuquerque, NM (US)

(72) Inventors: Kenneth Gerald Blemel, Albuquerque, NM (US); Francis Edward Peter, Albuquerque, NM (US); Kenneth Dominick Blemel, Albuquerque, NM (US); Peter Andrew Blemel, Albuquerque, NM (US)

( * ) Notice: Subject to any disclaimer, the term of this patent is extended or adjusted under 35 U.S.C. 154(b) by 325 days.

(21) Appl. No.: 14/184,704

(22) Filed: Feb. 19, 2014

(65) Prior Publication Data

US 2014/0233141 A1 Aug. 21, 2014

Related U.S. Application Data

(60) Provisional application No. 61/850,533, filed on Feb. 19, 2013.

(51) Int. Cl.
*H02H 3/00* (2006.01)
*H02H 1/00* (2006.01)
*H02H 7/20* (2006.01)

(52) U.S. Cl.
CPC ............ *H02H 1/0023* (2013.01); *H02H 7/20* (2013.01)

(58) Field of Classification Search
CPC .................................................. H02H 1/0023

USPC ............................................................ 361/78
See application file for complete search history.

(56) References Cited

U.S. PATENT DOCUMENTS

| | | | |
|---|---|---|---|
| 6,433,976 B1 * | 8/2002 | Phillips | G01R 31/1218 361/42 |
| 6,456,471 B1 | 9/2002 | Haun et al. | |
| 7,123,154 B1 | 10/2006 | Smith | |
| 8,054,594 B2 * | 11/2011 | Wu | H02H 1/0023 361/42 |
| 9,053,881 B2 * | 6/2015 | Phillips | H01H 33/26 |
| 2007/0050178 A1 | 3/2007 | Linzey et al. | |
| 2008/0208532 A1 | 8/2008 | Blemel | |
| 2013/0258529 A1 | 10/2013 | Caroll | |

* cited by examiner

*Primary Examiner* — Stephen W Jackson

(57) ABSTRACT

A system for autonomous protection from fires and electrical shock of components used in construction of photovoltaic arrays is disclosed. The system detects conditions that left unattended will result in conflagration of combustible materials and unwanted electrification. The disclosed system provides an active control mechanism that operates to take defective components off line and thus provide protection from fire and electrification hazards that otherwise could arise. The system also provides means for annunciation and notification when actions are taken. The system can be used, for example, to determine that a photovoltaic (PV) module is at risk of conflagration of its flammable structural elements due to intense heat of plasma produced by a direct current (DC) arc at a point in the grid of conductors that collect and carry current from photovoltaic cells exposed to solar irradiation.

28 Claims, 11 Drawing Sheets

SYSTEM TO PROTECT FROM UNSAFE CONDITIONS IN AN ELECTRICAL POWER SYSTEM

CROSS-REFERENCE TO RELATED APPLICATIONS

This application claims the benefit of Applicants' prior provisional application, No. 61/850,533, filed on Feb. 19, 2013.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

LIST OF REFERENCED DOCUMENTS

U.S. PATENT DOCUMENTS

| Patent Number | Issue Date | Inventor |
| --- | --- | --- |
| 8,576,521 | November 2013 | Rodgers et al |
| 4,988,949 | January 1991 | Boenning et al |
| 5,862,030 | January 1999 | Watkins, et al |
| 6,249,230 | June 2001 | Baldwin et al |
| 5,218,307 | June 1993 | Hiller |
| 6,868,357 | March 2005 | Furse, et. al |
| 7,590,496 | September, 2009 | Blemel |
| 7,356,444 | April 2008 | Blemel |
| 7,277,822 | October 2007 | Blemel |
| 7,974,815 | July 2011 | Blemel |
| 7,049,622 | May, 2006 | Weiss |
| 8,410,950 | April, 2013 | Takehara, et al |
| 13/412,480 | March 2011 | Takada and Takehara |

Non Patent Documents

1. J. Johnson, K. D. Blemel, and F. E. Peter, "Preliminary Photovoltaic Arc-Fault Prognostic Tests using Sacrificial Fiber Optic Cabling", February 2013, Sandia National Laboratory Report SAND2013-1185, available to the public from U.S. Department of Commerce National Technical Information Service 5285 Port Royal Rd. Springfield, Va. 22161, http://energy.sandia.gov/wp/wp-content/gallery/uploads/Preliminary-Photovoltaic-Arc-Fault-Prognostic-Tests-using-Sacrificial-Fiber-Optic-Cabling.pdf.
2. M. W. Earley, P. E., et al, "2014 National Electric Code (NEC) Handbook," 2013 National Fire Protective Association, Quincy, Mass., Thirteenth Edition, p. 889-902.
3. J. Johnson, B. Pahl, C. J. Luebke, T. Pier, T. Miller, J. Strauch, S. Kuszmaul and W. Bower, "Photovoltaic DC arc-fault detector testing at Sandia National Laboratories," 19-24 Jun. 2011, Seattle, Wash., 37th IEEE PVSC.
4. J. Johnson, C. Oberhauser, M. Montoya, A. Fresquez, S. Gonzalez, and A. Patel, "Crosstalk nuisance trip testing of photovoltaic DC arc-fault detectors," 5 Jun., 2012, Austin, Tex., 38th IEEE PVSC.
5. J. Johnson and J. Kang, "Arc-fault detector algorithm evaluation method utilizing prerecorded arcing signatures," 5 Jun., 2012, Austin, Tex., 38th IEEE PVSC.
6. J. Johnson, "Arc-fault detection and mitigation in PV systems: Industry progress and future needs," 28 Feb. 2012, Denver, Colo., NREL Module Reliability Workshop.
7. J. Johnson, B. Pahl, C. J. Luebke, T. Pier, T. Miller, J. Strauch, S. Kuszmaul and W. Bower, "Photovoltaic DC arc-fault detector testing at Sandia National Laboratories," 19-24 Jun. 2011, Seattle, Wash., 37th IEEE PVSC.
8. "Outline of Investigation for Photovoltaic (PV) DC Arc-Fault Circuit Protection," Underwriters Laboratories (UL) Subject 1699B, 29 Apr., 2011.
9. J. D. Flicker and J. Johnson, "Photovoltaic Ground Fault and Blind Spot Electrical Simulations," SAND Report 2013-3459, http://energy.sandia.gov/wp/wp-content/gallery/uploads/SAND2013-3459-Photovoltaic-Ground-Fault-and-Blind-Spot-Electrical-Simulations.pdf.
10. J. Johnson, M. Neilsen, P. Vianco, N. R. Sorensen, M. Montoya, and A. Fresquez, "Accelerated Life Testing of PV Arc-Fault Detectors," SAND 2013-4831C, http://energy.sandia.gov/wp/wp-content/gallery/uploads/Johnson-_SAND2013-4831C_PVSC391.pdf.
11. D. Riley and J. Johnson, "Photovoltaic Prognostics and Heath Management using Learning Algorithms," SAND Report 2012-7148C, IEEE PVSC Conference Paper, http://energy.sandia.gov/wp/wp-content/gallery/uploads/38PVSC_DRiley_SAND2012-7148C.pdf.
12. J. Johnson, D. Schoenwald, S. Kuszmaul, J. Strauch, and W. Bower, "Creating Dynamic Equivalent PV Circuit Models with Impedance Spectroscopy for Arc-fault Modeling," Technical Paper, http://energy.sandia.gov/wp/wp-content/gallery/uploads/DynEquivPVCircuitModels.pdf.
13. J. Johnson, B. Pahl, C. J. Luebke, T. Pier, T. Miller, J. Strauch, S. Kuszmaul, and W. Bower, "Photovoltaic DC arc-fault detector testing at Sandia National Laboratories," SAND Report 2011-4234C1, IEEE PVSC Conference Paper, http://energy.sandia.gov/wp/wp-content/gallery/uploads/PVDCArcFault.pdf.
14. "Types of PV Systems Florida Solar Energy Center (FSEC)," a research institute of the University of Central Florida, http://www.fsec.ucf.edu/en/consumer/solar_electricity/basics/types_of_pv.htm
15. S. E. Smith and O. Wallace, "What Is a Disconnect Switch?" http://www.wisegeek.com/what-is-a-disconnect-switch.htm.
16. M. Faxå, "Applications of Disconnecting Circuit Breakers," 2006 IEEE PES Transmission and Distribution Conference and Exposition Latin America, Venezuela, p. 1-2, http://www.labplan.ufsc.br/congressos/td2006/Papers/TD06_525.pdf.
17. G. Stokes, "Handbook of Electrical Installation Practice." 2003, Wiley-Blackwell, ISBN 978-0-632-06002-3.
18. J. Johnson, B. Gudgel, A. Meares, and A. Fresquez, "Series and parallel arc-fault circuit interrupter tests," Sandia National Laboratories Technical Report, SAND2013-5916, http://energy.sandia.gov/wp/wp-content/gallery/uploads/SAND2013-5916-SeriesAndParallelArc-FaultCircuitInterrupterTests1.pdf.
19. T. Croft, F. Hartwell, W. Summers, "American Electricians Handbook," Sixteenth Edition, 23 Jul. 2013, McGraw Hill Professional—Publisher.
20. H. Bruce Land III, Christopher L. Eddins, and John M. Klimek, "Evolution of Arc-fault Protection Technology at APL" Johns Hopkins University Applied Physics Laboration (APL) Technical Digest, Volume 25, Number 2 (2004), http://www.jhuapl.edu/techdigest/TD/td2502/Land.pdf

BACKGROUND OF THE INVENTION

The present invention relates to electrical power systems and in particular, to alternative energy systems including, but not limited to, wind turbine, water turbine, steam and solar powered photovoltaic systems that supply power for residential, commercial, or industrial use. Nearly all energy systems have a source of direct current (DC) connected to equipment that combine, transform, limit, store, synchronize, and transport the energy for use with electrical appliances.

Photovoltaic (PV) power systems also include a load balancing subsystem comprising DC switching and protection devices, combiner boxes, circuit breakers, disconnect switches, mechanical relays, solid state relays, and contactors, which make or break the flow of current. Combiner boxes aggregate the DC power from the PV module strings and provide a parallel connection point (i.e., a common bus) for the PV strings, with the combiner box providing overcurrent protection and isolation. Combiner boxes are either source combiners or array combiners, with source combiners being located closer to the PV strings and array combiners, or re-combiners, for aggregating outputs from several source combiners into a single circuit.

The present invention focuses in particular to PV systems, which include multiple components, including DC power-producing units called PV modules, mechanical and electrical connections and mountings, and means of regulating or modifying the electrical output. The electrical energy is produced by devices made of, but not limited to, silicates that produce electrical current when exposed to solar radiation (sunlight). When manufactured with electrical conductors that carry the DC current produced the devices are commonly known as solar cells or PV cells. An arrangement of electrically connected PV cells configured is commonly called a PV cell string. One or more PV cell strings are assembled together into a PV module.

A PV system is comprised of components, including PV modules, which are composed of strings of PV cells that produce electricity from solar radiation. The strings of PV cells are joined to each other (if more than one cell string). The level of DC current and voltage produced is dependent on the number of PV cells, the intensity of solar radiation, and other environmental factors.

The efficiency of a PV module determines the area of a PV module given the same rated output (i.e., an 8% efficient fabric will have twice the area of a 16% efficient fabric to produce the same electrical energy output). A PV module can be directly connected to a load or to other PV modules through a junction box on the module, normally located on the back of the PV module. The connections of the PV cells to each other and to the junction box are by a multiplicity of conductors that are attached to the modules and to other conductors to complete the electrical circuit through the PV module.

Output from several PV modules are often combined to aggregate the current or voltage in a PV array. One common arrangement in PV systems is to connect output from PV modules to high-capacity energy storage units, which relate to conventional DC batteries, to store excess energy for use when solar radiation is insufficient. When alternating current (AC) power is desired, an inverter is used to convert the DC energy from the array into AC energy, such as AC energy suitable for transfer to a power grid.

Recent PV modules are equipped with micro inverters at the output that convert DC to AC at the PV module. Such PV modules are wired in parallel, which produces more output than normal panels, which are wired in series with the output of the series determined by the lowest-performing panel. Micro-inverters work independently so each panel contributes its maximum possible output given the available sunlight.

For safety reasons, PV modules are commonly connected to a DC disconnector device. If several PV modules are generating DC, the output is often connected to a DC combiner box. Some of the generated power is often stored in an energy storage unit comprised of batteries in addition to being connected to electrical transformers. Some of these embodiments use DC to DC converters to raise or lower the voltage before delivering the DC current to an alternating current (AC) power converter (also known as an inverter). Output from an inverter usually connects to an AC distribution unit that transforms, signal conditions, synchronizes, and connects the AC power to transmission lines. Systems embodied with only PV modules with AC micro-inverters omit much of this equipment and deliver the AC power output directly. Some additionally connect with an AC to DC converter to a DC storage unit that provides for a reserve capability when night falls or solar radiation is insufficient, which can be caused by increased load or simply clouds, snow, sleet, or rain.

The present invention also relates generally to conventional circuit breakers and Arc-fault Circuit Interrupters (AFCI) used in photovoltaic (PV) arrays. AFCI and conventional thermal circuit breakers only respond to overloads and short circuits on the load side, so they do not protect against thermal conditions or hot spots that lead to arcing conditions that produce erratic, and often reduced current on the source side. Conventional thermal sensors identify the temperature of objects in proximity, but do not protect against electrical arcing. AFCI typically use the arc-generated noise on the DC system to identify the arc-fault and then mitigate it by de-energizing the PV system. This approach is limiting, as it requires an arc-fault to be present before remediation is possible. Since AFCI isolate the PV source (arcing) from the load, current flow is stopped and the whole PV module string is shut down. This action will quench a series arc, but conversely would cause all energy normally flowing to the load to now be shunted into a parallel arc, should that be the fault mode. Such additional energy flowing into the parallel arc would make the problem worse instead of resolving it. Of these sensors, only a thermal sensor or a visual inspection might be able to find a hot spot, but coverage to detect such a condition is problematical at best.

When photovoltaic cells were first produced, their efficiency was limited and the amount of energy produced was small compared with the power produced by PV cells today. Efficiency of the photovoltaic cells is ever-improving with new techniques, such as multiple layered (3-dimensional) cells developed at Sandia National Laboratory.

At the time of preparing this patent application, the most efficient mass-produced solar modules are reported to have energy density values of up to 16.22 W/ft$^2$ (175 W/m$^2$); sufficient electrical energy to cause several failure modes including hot spots, arc-flash events, series arc-faults along the conduction path, and parallel arc-faults that connect to ground through exposed conducting components.

The energy generated by the PV module, whether used alone or when PV modules are connected in series with each other, can result in localized heating. This heating, if severe, can subsequently result in a localized fire, which may spread to any mounting structure or material (including a building), which may be located under or adjacent to the PV panel. The localized heating may also degrade the conduction path in a manner that when sufficient energy is present, a series arc-fault can be established in the conduction path. Such an arc-fault generates hot plasma and intense heat. Since the supporting energy of the arc-fault is DC, there are no current zero crossings as in AC and the arc does not self-extinguish and continues as long as sufficient energy exists. The intense heat readily causes any supporting structure, buildings, etc. to rapidly catch fire.

Another failure mode of electrical systems is an arc-flash that is caused by defects, oxidation, externally induced energy, etc. According to statistics compiled by CapSchell, Inc. (a Chicago-based research and consulting firm that specializes in preventing workplace injuries and deaths), there are five to ten arc-flash explosions that occur in electric equipment every day, resulting in medical treatment. An arc-flash is a breakdown of the air resulting in an arc, which can occur where there is sufficient voltage in an electrical system and a path to ground, neutral, or another phase. An arc-flash, with a high level of current, can cause substantial damage, fire or injury. The massive energy released in an arcing fault can instantly vaporize metal in the path of the arc, blasting molten metal and expanding plasma outward with extreme force. The result of the violent event can cause destruction of equipment, fire, and injury, not only to the worker, but also to nearby persons.

A series arc-fault results when a junction of an electrical circuit opens intentionally or unintentionally. If the fault is a ground fault, the energy from the conduction path conducts to external frame and supporting structure. The intense heat generated can result in the supporting structure, buildings, etc. to rapidly catch fire. Additionally, the parallel arc-fault causes the ground path to become electrically energized, adding an additional shock hazard. Smoke and fire created by all of the PV module faults cause severe difficulties for firefighters since the fire source is electrified with sufficient energy to cause injury. To avoid injury, firefighters, called to the scene of a fire caused by a faulty PV module, generally just hose down neighboring structure, and let the arcing modules burn.

All this increased efficiency poses a significant safety problem caused by DC arc-faults within a PV system. For instance, a PV module is rated by its DC-output power under standard test conditions (STC), at 25 degrees Celsius. Typically, today's output ranges from 100 to 320 watts. In the case of a PV module, the intense heat can ignite combustible materials used in the module construction, which quickly spreads to nearby combustible material, such as grass or roofing materials.

In the United States, the authority having jurisdiction (AHJ) review designs and issue permits, before construction can lawfully begin. Electrical installations, which are governed by the NEC, are inspected by the AHJ to ensure compliance with building code, electrical code, and fire safety code. In particular, electrical installation practices must comply with standards set forth within the National Electric Code (NEC), which governs when individual municipalities or states adopt the requirements set forth therein. The NEC is a publically-available, non-patent document that, because of relevance to the state of art of electrical systems, is included in its entirety herein.

The following is a direct quotation of section 690.11 of the 2014 National Electric Code: "Photovoltaic systems with dc source circuits, dc output circuits, or both, operating at a PV system maximum system voltage of 80 volts or greater, shall be protected by a listed (dc) arc-fault circuit interrupter, PV type, or other system components listed to provide equivalent protection. The PV arc-fault protection means shall comply with the following requirements:
  (1) The system shall detect and interrupt arcing faults resulting from a failure in the intended continuity of a conductor, connection, module, or other system component in the dc PV source and dc PV output circuits.
  (2) The system shall require that the disabled or disconnected equipment be manually restarted.
  (3) The system shall have an annunciator that provides a visual indication the circuit interrupter has operated. This indication shall not reset automatically."

Furthermore, existing switch mechanisms in PV power systems cannot be automatically reset/reclosed after isolation of a faulted circuit so as to restore a circuit with healthy strings or combiner boxes—as would be desired in combiner boxes that are remote and not easily accessible. In fact, Section 690.11 of the National Electric Code (NEC), cited previously, specifically prohibits automatic reset/reclose actions for isolating an arc-fault in a PV module. In addition, in existing PV power systems that employ conventional switches that cannot be remotely operated, it is not possible to continue to supply power in a PV system while the unsafe condition on a particular PV string is being addressed, such that the PV power system can continue to operate even while the fault is being addressed. This causes undesirable down time.

There is a plethora of publically available documents such as, "American Electricians Handbook" by T. Croft, F. Hartwell, and W. Summers (which is included in its entirety by reference herein), that teach electrical system designs and installations as well as problems related thereto. Other documents are publicly available that teach how to design protection systems, controllers, photon detectors, circuit interrupters, and logic.

For example, improper shutdown of a single PV module generating electricity can potentially create great harm to the PV system by causing a load shift that results in overloading of circuits, which can potentially cause overheating, arcing, and collateral fire damage.

In addition to the problems that can be caused by improper shutdown of a PV module, as solar cells have become more efficient, PV modules can experience DC arc-faults that continue until the solar radiation diminishes as the sun sets. DC arc-faults can occur even when the operating voltages and currents are within normal bounds; such as, but not limited to, deformation of the structure, thermally induced expansion and contraction, or a manufacturing defect. The problem is so serious that the Fire Protection Association modified the 2014 National Electric Code with requirements such as, but not limited to, installers of PV systems must provide Underwriter's Laboratory (UL) listed detection and interruption of electrical faults to prevent death and injuries resulting from electrocution and fires that can quickly engulf and destroy homes, facilities, property, and cause injury and death.

Currently, PV component architects, designers, installers, and maintainers have few options to choose from to comply with the new NEC requirements to prevent unsafe conditions. One option is a micro inverter with costs starting at over $100 U.S. per panel. There are usually 20 solar panel units in a residential solar array, resulting in a potentially $2000 overall cost increase. A second option is a combiner box containing arc-fault detection, which sells for over $1000 U.S. in today's (2014) market. Neither of these options addresses all of the problems of in-module arcing, which can continue until the sun sets or the module self-destructs beyond the ability to sustain the arc. These products do not detect hot spots or arcing in the solar panel and do not eliminate the danger of fire and the human and property hazards that result in liability to installers, manufacturers, and insurance companies. The existing products only shut down entire systems after an arc has occurred in the junction box or in the wiring that goes to the combiner box.

There is a pressing need for an improved AFCI-like mechanism described in detail in the present invention that acts autonomously to reduce the risk of arc-faults happening and, additionally, a control system that employs logic for purposes of clearing faults on unsafe electrical system components, including PV modules and restoring electrical service of healthy components including, but not limited to, PV sub-arrays, healthy PV strings, and healthy PV modules.

It would therefore be desirable to provide a self-protecting autonomous protection system with pre-arc unsafe-condition detection therein that works even when voltages and currents are within normal limits. Further, the protection system would meet the NEC Section 690.11 and other NEC requirements by annunciating unsafe conditions in PV system equipment and associated wiring. The protection system applied to PV modules would provide mitigation before the arc-fault occurs, shutting down the PV module with an unsafe condition; therefore preventing fire damage and human disasters by properly shutting off only the unsafe module in a safe manner and alerting the system owner or consumer for replacement or reinstatement.

The present application teaches a protection system for electrical power systems. The focus herein is on applying the protection system to PV modules wherein defects (including but not limited to hot spots), and faults (including but not limited to arc-faults), are detected and mitigated before the defect or fault can propagate beyond a localized event. This patent describes use of photons (light) to detect unsafe conditions in virtually any electrical system component and teaches actions that isolate and announce an unsafe condition, defect, or fault in a manner that functional PV modules remain operational and that even unfaulted parts of a PV system remain functional.

DISCUSSION OF PRIOR ART

There are numerous examples of prior art, including patents and publications that present principles, methods, apparatus, and techniques for detecting and mitigating active DC arc-faults when they occur. Several companies have begun embedding electronics into PV modules to detect PV module arc-faults when they occur.

Searches of the world wide web, and in particular the USPTO site patent database, did not find an issued U.S. patent or U.S. patent application that teaches detecting and mitigating unsafe condition actions in PV systems using translucent sensors. The following are instances of prior art that a) use monitoring output voltage with electrical means determine a PV module is not producing electricity within expected range; and b) use of electrical means to determine that insulation is degrading.

U.S. Pat. No. 8,576,521, issued to Rodgers, et al, teaches a controller-based detection system configured to adaptively learn to distinguish between detected light that is indicative of an arc-fault event and detected light that is not related to an arc-fault event. During normal operation of the electrical power system, the adaptively determined one or more detection algorithms are utilized to identify arc-fault events in the electrical power system. Rodgers et al does not teach using light to detect and taking control action before an arc-fault happens.

U.S. Pat. No. 8,410,950, issued to Takehara, et al, teaches a photovoltaic (PV) panel monitoring apparatus includes a monitoring module for measuring parameter values related to PV panel output, comparing measured values against minimum and maximum values saved in the monitoring module, and outputting an alarm signal when a measured value is outside a range defined by the minimum and maximum values. Takehara, et al U.S. Pat. No. 8,410,950 teaches monitoring output voltage and current. Takehara does not teach monitoring parameters within the panel to detect unsafe conditions.

Inventors Takada and Takehara filed U.S. patent application Ser. No. 13/412,480, which teaches methods for measuring insulation resistance in a PV array. Takada and Takehara do not teach monitoring to detect unsafe conditions with translucent sensors.

H. Bruce Land III, Christopher L. Eddins, and John M. Klimek (Land, et al) of the John Hopkins University Applied Physics Laboration in a paper publicly available on the web entitled "Evolution of Arc-fault Protection Technology at APL" claims that an electrical fire is reported in the United States every five minutes. This paper documents that that APL and created the Arc-fault Detection (AFD) system to detect and quench these fires. This paper also documents that APL developed circuit breakers that are the follow-on to AFCI and Ground Fault Interrupter (GFI) breakers, intended to protect from small sputtering 1-ampere to 2-ampere arcs. Land, et al present that such small amperage arcs release more than enough heat to set carpets, drapes, and wood on fire. This paper also presents that Square D Corporation, a large breaker manufacturer, notes that this technology is not likely to ever work in commercial environments because of the high level of electrical noise and the higher currents in commercial use. While AFCIs are an improvement for residential service, Land et al does not teach detecting unsafe conditions leading to an arc-fault.

U.S. Pat. Nos. 7,590,496, 7,356,444, 7,277,822, and U.S. Pat. No. 7,974,815 to Blemel teach using sensitized translucent sheets, strips, or strands (including but not limited to translucent glass and polymer), arranged on the surface of single and branched conduits, to detect damage such as caused by an arc, incision, solvent, or flame. Blemel does not teach a protection system for electrical system components and associated interconnections using an electrical circuit interrupter device.

OBJECTS AND ADVANTAGES

An important objective of our invention is to use a proactive approach that detects, annunciates, and mitigates unsafe conditions of PV system components, such as defects in the electrical conductor grid that collects PV cell energy in a PV module. One type of unsafe condition is excessive heat at a juncture, which is known to be a precursor of an arc-fault. Our invention detects these defects and takes pre-emptive control action to shut down current flow to prevent the arc from happening.

The advantages of the present invention are perhaps best summarized by words from Sandia National Laboratory Report SAND2013-1185 (Reference #1) which says: "One clear advantage of the current invention technology is that it doubles as a prognostic tool, which is capable of either automatically de-energizing or simply warning the home or plant owner of a dangerous situation before an arc fault occurs."

Other advantages of the present invention, discussed further in following paragraphs include, without limitation,
  provides defensive mechanism to prevent DC arcs from happening;
  detects series arc-faults and isolates the affected component should they occur;
  provides protection with isolation for series DC arcs and parallel DC arcs
  can be used with new or existing PV system components, such as but not limited to, PV modules, combiner boxes, inverters, and connections;

operates autonomously to prevent danger of fire due to defect or arc-fault;

monitors for conflagration of smoldering combustible materials;

provides means for visible and message alert of the health status of a PV module;

provides means for shut down of a PV module to ground in the case of parallel faults;

provides means for shutdown to open for series arc-faults;

provides means to isolate an unsafe string of solar cells in a PV panel;

simple, low cost, and easy to implement.

It is a very significant advantage over prior art that the present invention meets and exceeds the 2014 NEC 690.11 requirement for detecting DC arcs in PV systems by using a controller, interrupter device, photodetectors, light source, and translucent sensors in combination to detect, mitigate, and isolate a DC arc-fault. Even more significant is that the present invention identifies unsafe conditions that lead to arc-faults and takes action to isolate the unsafe component.

It is an advantage of the present invention that melting points of translucent polymers used in the sensors can be adjusted by modifying the polymer formulation, or choosing from commercially available polymers (such as, but not limited to, polystyrene or acrylic), that melt at above a certain temperature to detect temperatures of a proximal defect.

It is an important advantage over prior art that attempts to detect arc-faults remotely in that the present invention detects series arc-faults at the point of arc that are caused by, but not limited to, severe strain on a conductor joint caused by deformation of the PV module frame which could be caused without limitation by collapse of a structural element due to accumulation of ice or snow, or a strong wind.

It is an advantage over prior art that the present invention provides protection with isolation for series DC arcs and parallel DC arcs by the controller operating the interrupter as taught in the specification.

It is an advantage over prior art that the present invention can be used in the manufacture of PV modules by extruding or laying the translucent sensors on the side of the glass pane nearest the conductors on the sun facing side of the module; or on the surface of the plastic used below the PV cells. For legacy PV modules, the translucent sensors can be laid on tape backed by a permanent adhesive, which is placed on the cover glass pane over the conductors; or on the plastic sheet; or around the inner perimeter of the frame where parallel arcing can occur. The melting point temperature of the translucent sensor should be formulated for maximum performance. Similarly, a sensor can be placed proximal to the diodes or other devices that can, over time (or due to a manufacturing defect), separate and arc in combiner boxes, inverters, and other equipment downstream from the PV modules. Similarly, sensors can be applied to the interconnection wiring to detect chafing caused by rubbing on a structure or chewing by rodents that exposes the inner conductors.

It is an advantage over prior art that the present invention operates autonomously to prevent danger of fire due to defect or arc-fault, which is a considerable advantage over prior art.

It is an important advantage over prior art that the present invention isolates PV modules with series and parallel ground-short arcing.

It is an important advantage over prior art that the present invention detects unsafe conditions leading to cascading of power caused by internal, parallel arc-faults.

It is an important advantage over prior art that the present invention proactively monitors electrical connectivity harnesses and detects unsafe conditions as well as arc-faults therein.

It is an important advantage over prior art that the present invention monitors for conflagration of smoldering combustible materials because the smoldering embers left by the hot plasma of a series arc are known to continue to smolder until extinguished by oxygen starvation. The present invention remains active, on the alert for heat of smoldering embers.

It is an advantage over prior art that the present invention provides means for visible alert of the health status of a protected PV module or other protected PV system component that has an unsafe condition.

It is an advantage over prior art that the present invention provides means for interrupting power of a PV system component to ground in the case of unsafe conditions, which can cause structural arcing, structural deformation, and other damage to a PV system as well as risk of human injury due to high current.

It is an advantage over prior art that the present invention provides means for shutdown before series arc-faults occur.

It is an advantage over prior art that the present invention provides means to isolate an unsafe string of solar cells in a PV module before the string causes a cascade effect that expands the potential for fire and damage.

Perhaps most important is that the present invention is simple, low cost, and easy to implement because there are hundreds of millions of PV modules in use today, over one hundred million being installed this year in the U.S.A. alone, and the number of new PV systems being installed is currently doubling each year. Having a low cost, simple, and easy-to-implement means to provide self-protecting PV systems can save many lives, prevent injury many times over, and save homes, buildings, and property from ravages of fire.

SUMMARY OF THE INVENTION

The present application teaches a unique autonomous mechanism for fault detection and isolation of an unsafe PV module. Further, it teaches meeting the NEC code requirements by providing detection and mitigation before or when the arc-fault occurs, not shutting down the array, but preventing fire damage and human disasters by employing DC interrupter controlled by a logic circuit for properly shutting off only the unsafe module and alerting for replacement of the unsafe PV module and associated maintenance to mitigate another occurrence.

In a best embodiment of the present invention, a PV module is protected with a system that includes a wired logic controller connected to an interrupter device that, when turned on, isolates the module, and a mechanism to annunciate the module has been shut off because it is unsafe. The interrupter device can also be configured to restore the module to operation when no unsafe condition is confirmed by certified inspection, so as to clear the unsafe condition.

In accordance with another aspect of the present invention, a wired logic controller is configured to operate either on energy from the PV module it serves or energy from one or more solar cells responsive to received solar irradiation so as to provide features such as a self-test function, ability to annunciate, and ability to be interrogated by wired or wireless link.

In accordance with yet another aspect of the invention, a method of controlling the operation of a PV module includes a protection box coupled to or replacing the existing junction box; measuring at least one voltage and current produced by a detector coupled to a sensor, and processing the information for determining an unsafe condition on the wiring harness coupled to the PV Module and if an unsafe condition is determined, generating an unsafe condition signal. The unsafe condition criteria could include, but not limited to, one or more of a threshold value, a range of threshold values, or a predetermined signature. On receiving an unsafe condition signal, the interrupter device operates to provide protection by safeing the unsafe condition. The step of controlling operation of the interrupter device further includes causing main contacts to open and remain open when an unsafe condition is detected. The controller can also be configured to cause the interrupter to restore the power connection when no unsafe condition is confirmed by certified inspection, so as to clear the annunciation of an unsafe condition.

In accordance with yet another aspect of the invention, a method of controlling operation of a PV module includes detecting an unsafe condition on the wiring harness coupled to the PV Module junction box by incorporating a protection box that utilizes light measurement and causing an unsafe condition signal that causes a switch to activate a DC interrupter device in order to isolate the unsafe condition. The step of isolating the unsafe condition further includes causing main contacts of the interrupter device to open and remain open when an unsafe condition is detected.

The controller is also able to be configured to cause the main contacts of the interrupter device to complete the circuit when no unsafe condition is confirmed by certified inspection, so as to clear the unsafe condition.

Various other features and advantages of the present invention will be made apparent from the following detailed description and the drawings.

BRIEF DESCRIPTION OF THE DRAWINGS

Various embodiments of the invention are disclosed in the following detailed description and accompanying drawings.

REFERENCE TO NUMERALS USED IN DRAWINGS

Figure 1:
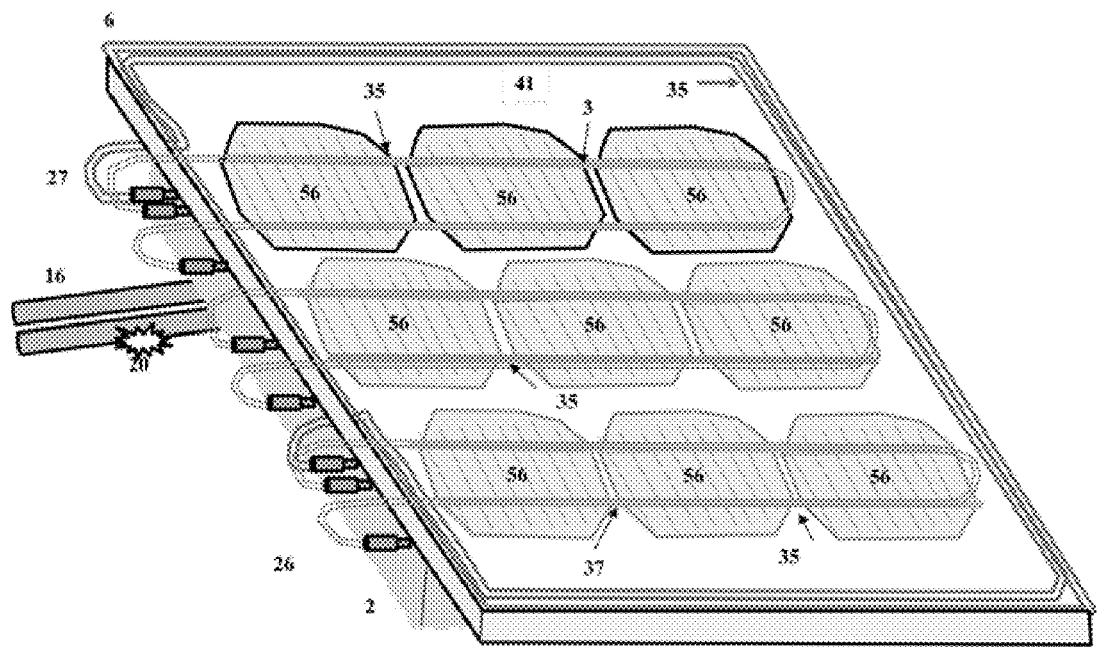
FIG. 1 is a perspective view of an exemplary embodiment of a PV module with four sensors for detecting an unsafe condition.

1 Frame
2 Protection Box
3 Electrical bus
4 Translucent sensor
5 Protective Glass
6 PV Module Structure
7 Energy Storage Unit
8 Sensor Loop
9 PV Cell
10 DC Conductor
11 RF Antenna
12 Output Cable Connector
13 Support Surface
14 System Component
15 Bonding Point
16 PV Wiring
17 Sensor Strand
18 Elastomeric Material
19 Melted Sensor
20 Chafe
21 Power outlet coupling
22 Sensor coupling
23 USB Port
24 Latched Semaphore
25 DC current
26 Light Source Coupling
27 Detector Coupling
28 Overheat Sensor
29 Diodes
30 Light source
31 Darkness Sensor
32 Display
33 Current Conductor coupling
34 Ground conductor coupling
35 Opaque-coated sensor
36 Branched Darkness Sensor
37 Resistive Joint
38 Unsafe Condition indicator
39 Protection Active indicator
40 Potential Hazard Point
41 Ground fault
42 PV DC coupling
43 PV Ground coupling
44 Disconnect signal
45 DC Output
46 Fire
47 Clamp
48 Unsafe Condition
49 Controller
50 Switch
51 DC Energy Storage Device
52 Unsafe Condition Signal
53 Interrupter Device 54 Solar Radiation
55 Sun
56 PV Cell String
57 Photodetector
58 AC Distribution Panel
59 AC Grid
60 Ground Cable
61 PV Module
62 DC Combiner
63 Disconnect Box
64 DC to DC Booster
65 Inverter
66 AC Disconnect
67 Power Connector
68 Resistive Heating
69 PV Module Junction Box
70 Current Conductor coupling
71 Ground conductor coupling

DESCRIPTION OF TERMS

Mitigation: relief; alleviation. Source: Wiktionary.

Switching means that it includes a Disconnector, Disconnect Switch or Isolator Switch; Source: S. E. Smith (2012).

Translucent media used in construction of the sensors, taught by this patent, can be extremely thin, usually less than 0.001 inches; can be flat or circular, hollow or solid.

Illumination includes the use of both artificial light sources (such as lamps and light fixtures), as well as natural daylight.

Change of material state generally means changing from a solid to a liquid; or from liquid to a gas; or a gas to plasma. Change of material state of a glass, polymer, or other illumination guiding means causes a measureable change of one or more properties of said guided illumination, including but not limited to, intensity, wavelength spectrum, and polarization.

The present invention also relates to translucent media such as polymers and glass that change physical characteristics when heated, or break under shock stress from arcing.

Light detection is a response from exposure to photons. The light detection means can be selected from, but not limited to, a photodiode, phototransistor, or photo resistor, which receives sunlight or artificial light and produces a measurable voltage or current output. Commercially available devices are acceptable. Reliability, stability, and durability are key parameters to be considered in making a selection. The light detection means should be selected for ability to reliably generate an output signal for the limited amount of the frequency of light that will be conducted by the translucent material. The photodetector device should be appropriately biased, if necessary, to operate in the full range of expected illumination.

Light sources are accumulations of photons. Photons operate at wavelengths often referred as infrared to ultraviolet, commonly known as UV or black light. White light is multispectral. Light sources, without limitation, can be a light emitting diode, candle, fire, incandescent lamp, or laser. When used in sensors according to the present application, light sources should be selected so as to produce wavelengths that are compatible with an associated photodetector. Commercially available devices are acceptable. Reliability, stability, and durability are key parameters to be considered in making a selection.

The controller, without limitation, can be a digital circuit, an analog circuit, or a combination of analog or digital circuits. The controller should be able to receive analog and digital input signals and also have analog and digital outputs for operating annunciators and actuators. Commercially available devices are acceptable. Reliability, stability, and durability are key parameters to be considered in making a selection.

The interrupter device should be appropriate for the amount of current to be interrupted and can be built with combinations of devices such as, but not limited to, relays, solid state switches, and contactors. Commercially available devices are acceptable. Reliability, stability, and durability are key parameters to be considered in making a selection.

The translucent media used in constructing the sensors can be glass, polymer, or other that has appropriate key parameters for the intended application. The shape should be selected for the size and length of sensing coverage needed. The melting point is a key consideration for selecting a hot spot sensor. An opaque coating, if used, should be non-oxidizing to prevent corrosion, which would allow light to penetrate. This is important when sensing lack of light indicates a safe condition. Commercially available materials are acceptable. Reliability, stability, and durability are key parameters to be considered in making a selection.

The means for determining an unsafe condition could include, but is not limited to, tuning the bias or programming to work effectively. An appropriate timing delay should be built in or incorporated so as not to generate false alarms due to voltage spikes or interference.

The sensors can be, for example and without limitation, loops, strips, pieces, and strands constructed with coated or uncoated translucent media of any length, axial, and longitudinal dimension. The translucent media can be glass, silica, or polymers such as, but not limited to, styrene, polyester, or acrylic; and should be selected for having appropriate characteristics such as, but not limited to, thickness, doping, melting point, frangibility, stiffness, tensile strength, and bend radius. If coated, the coating should be appropriate for the application such as, but not limited to, anodized with a noble metal, or a dielectric material. Any doping used to formulate the translucent material should prevent discoloration or occlusion of light for so long as the system component wherein it is installed. Another property would be how the material conducts or does not conduct light when it changes state due to heat or fracture.

The Interrupter Device should be designed with the ability to handle the DC current on the conductors.

The DC Energy Storage Device should be selected for operating safely as long as possible and to hold sufficient charge.

DETAILED DESCRIPTION OF THE DRAWINGS

Various embodiments of the invention are disclosed in the following detailed description and accompanying drawings. Each drawing teaches how to implement the techniques and or components to effect the purposes of this patent.

In one embodiment, configuration of the protection system apparatus of the present invention change of state of a translucent sensor identifies unsafe condition of complex PV system components, such as but not limited, to a PV module, DC converter, DC to AC inverter, energy storage unit, disconnector, and AC distribution panel. The unsafe condition such as, but not limited to, accumulation of fluids, gnawing by rodents, arc-fault, wire chafing, high temperature of a component, or hot spot in an electrical bus. Once an unsafe condition is detected, the self-protecting apparatus de-energizes the circuit and reduces the potential for a fire or safety hazard to occur.

Referring now to FIG. 1, which is a perspective view of an exemplary embodiment of a PV module with sensors for detecting unsafe conditions. The components identified in FIG. 1 are: frame 1, protection box 2, electrical bus 3, three PV cell strings 56 in the PV wiring 16, an opaque-coated sensor 35, detector coupling 27, light source coupling 26, chafe 20, resistive joint 37, and ground fault 41.

Still referring to FIG. 1, an opaque-coated sensor 35 functions in a dark environment, such as underneath the solar fabric of a PV module. The sensors also have application to detect unsafe conditions such as overheated diodes inside a DC combiner, disconnect box, DC to DC booster, DC to AC inverter, or AC disconnect. Translucent sensors will also have application under the insulating coating of a wiring cable.

The opaque-coated sensor 35 has use in illuminated areas. When the opaque coating is breached, light rays enter the sensor. The breach could be caused by many factors, such as, but not limited to a chafe 20 exposing the translucent media, the erosion could be caused, but not limited to, rubbing against a structure. If the sensors are installed at the manufacturer, the breach could be caused by a manufacturing defect. The breach can also be caused by, but not limited to, an installer, an inspector, a maintainer, a rodent, act of nature, or a vandal.

Still referring to FIG. 1, the disproportionate drawing of the notional protection box 2 shows the tips of the above sensors would mate with a respective light source coupling 26 or detector coupling 27. A Photodetector would receive the conducted light and generate a signal to the controller, which makes a determination of an unsafe condition signal which causes a switch to illuminate an unsafe indicator and causes the interrupter device to disconnect the DC power circuit.

Referring again to FIG. 1, a person familiar with constructing sensors would appreciate that there are limitless configurations that can be constructed. Further, that darkness sensors have purpose when presence of light is indicative of an unsafe condition and lightness sensors have purpose when absence of light is indicative of an unsafe condition.

Figure 2:
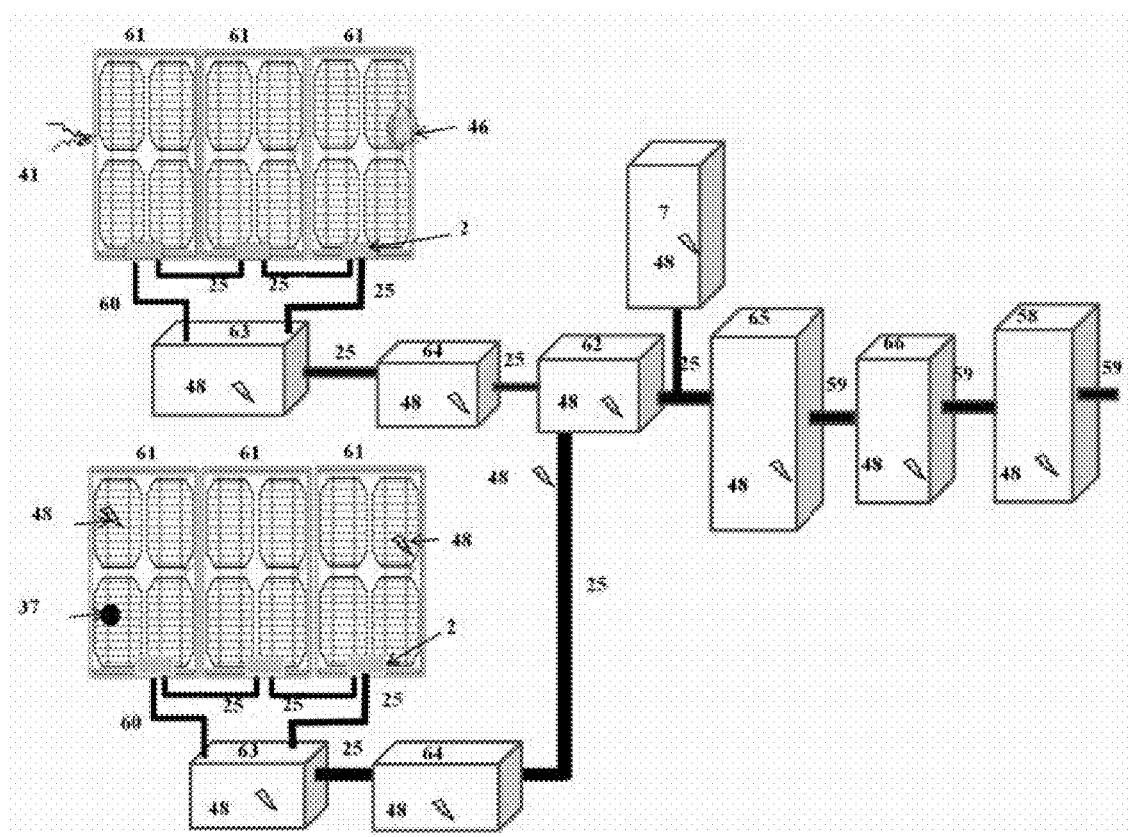
FIG. 2 is a block diagram of an exemplary PV system showing a variety of PV system components.

Referring now to FIG. 2, the items referenced by number are: two example strings of PV modules 61, protection boxes 2, a DC disconnect box 63, a DC to DC booster 64, a DC combiner 62, an energy storage unit 7, an inverter 65, an AC disconnect 66, a ground fault 41, an AC distribution panel 58, symbols for potential unsafe conditions 48, and a ground cable 60 for each component. In addition, there is depicted a DC current 25, AC grid 59, a symbol for a fire 46 and a resistive joint 37.

Again referring to FIG. 2, there are: two strings of PV modules 61; each module with a protection box 2 connects to form the string that feeds DC power into a DC Disconnect Box 63 feeding to a DC to DC Booster 64, which in turn feeds boosted DC power to a DC Combiner 62, which sums the energy from each of the PV module strings. The combined power feeds DC power to an energy storage unit 7 and to a DC to AC inverter 65 that produces AC power, which is conducted to an AC disconnect 66 and then to an AC distribution panel 58 that connects power to the AC grid 59. Power is conducted by approved wiring. Symbols for potential unsafe conditions 48 and a ground cable 60 are on each component. (Labeling of ground wires is generally omitted.)

Referring again to FIG. 2, the functions of the components are as follows: PV modules 61 utilize a series of PV cells to generate energy consisting of voltage and current. Each PV module incorporates a protection box 2 whose function is to connect the PV cells of the module together and to connect the several modules to each other and to the PV disconnect box 63 using approved wiring. The DC Disconnect then connects energy to an optional DC to DC Booster 64, which provides a stabilized PV energy to the DC combiner 62, which sums energy from the several PV module strings. The summed DC energy is fed to an inverter 65, which converts the DC energy into AC energy. The AC energy is then passed through an AC disconnect 66 for safety and then is coupled to the AC distribution panel 58 where the AC energy is connected to the AC grid distribution system. The energy storage unit 7 stores excess capacity when solar radiation is sufficient and releases energy when solar radiation is insufficient.

Still referring to FIG. 2, this diagram is simplified. A person familiar with the art of solar power systems would understand the configuration presented in this exemplary diagram is notional because small systems might use a string of twelve PV modules while a field array might have twenty or more PV modules in each string and thousands of strings. A person familiar with electrical power systems would understand that each component can degrade over time and develop an unsafe condition 48.

Figure 3:
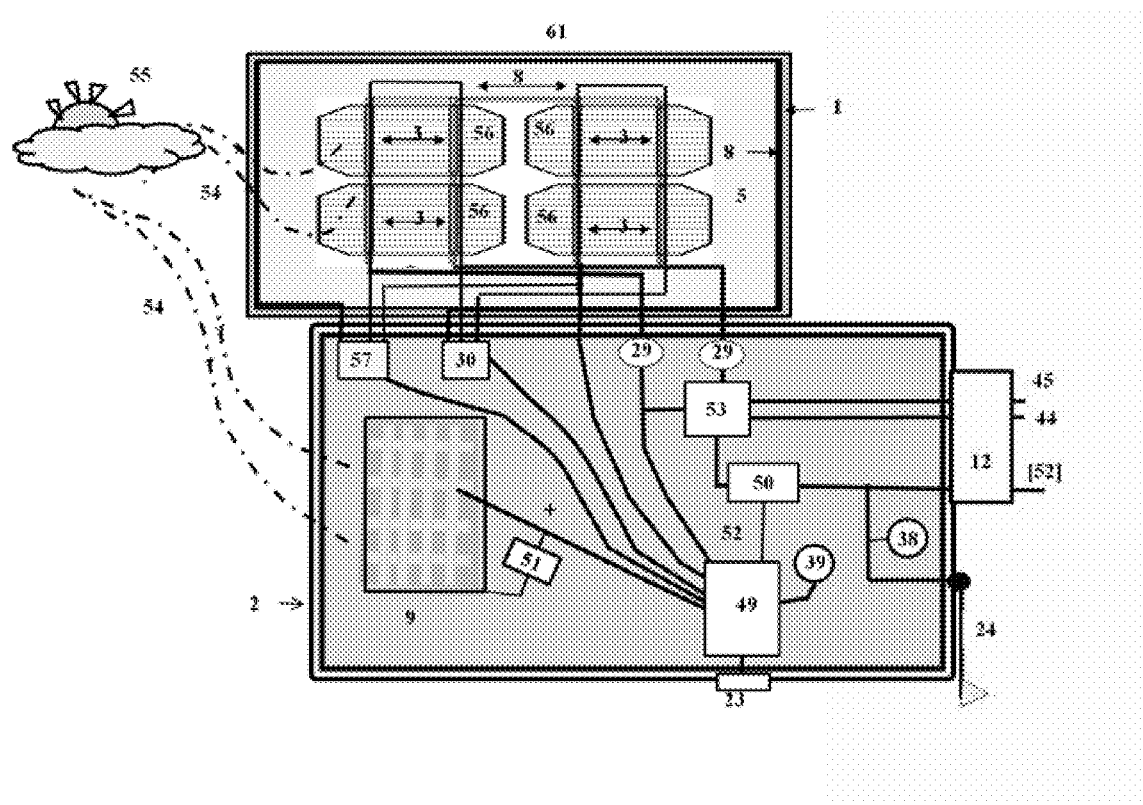
FIG. 3 is a drawing of an exemplary embodiment showing the components of the present patent connected to a PV Module in a PV system.

Referring now to FIG. 3, the sun 55 emits solar radiation 54, which strikes a PV module 61, which includes a frame 1 holding an array of several PV cell strings 56 connected by an electrical bus 3 under a protective glass 5. Two sensor loops 8 are proximal to the junctions of the electrical bus 3 and another sensor loop 8 is proximal to the frame 1. The protection box 2 components consist of: a light source 30, photodetector 57, protection active indicator 39, unsafe condition indicator 38, PV interrupter device 53, USB port 23, controller 49, switch 50, DC energy storage device 51, PV cell 8, diodes 29, and a latched semaphore 24. Output cable connector 12, with conductors for DC output 45, external disconnect signal 44, and unsafe condition signal 52 are included.

Referring again to FIG. 3, the sun 55 emits solar radiation 54, which strikes a PV module 61, (the functions of the PV module components were described for FIG. 2). The function of the sensor loops 9 arranged proximal to the electrical bus 3 in the PV module 61 are to carry light from a light source 30 to a photodetector 57 and are selected to melt or break to excessive heat such as from a resistive joint in an electrical bus 3 or plasma of a DC arc. The function of the controller 49 is to process a signal from photodetector 57 to determine an unsafe condition signal 52. The function of the protection active indicator 39, unsafe condition indicator 38, and the latched semaphore 24 are to provide visual information. The function of the switch is to operate the visual indicators and the interrupter device 53. The function of the interrupter device 53 is to interrupt DC power from the PV module 61 upon receiving an unsafe condition signal 52 or an external disconnect signal 44. The function of the latched semaphore 24 is to unlatch the semaphore when no DC current flows from the PV module 61. The function of the DC energy storage device 51 is to store power for the electronic components in the protection box 2 should PV module 61 power be unavailable. The function of the PV cell 9 is to charge the DC energy storage device 51. The function of the USB port 23 is to provide external interface to the controller 49. The purpose of the latched semaphore 24 is to provide external visual indication of an unsafe condition.

Still referring to FIG. 3, this diagram is simplified and the architecture in this diagram is notional. A person familiar with electrical components would understand that components could degrade over time and develop an unsafe condition. A person familiar with electricity and electrical circuits would appreciate that solder connections degrade due to oxidation and other factors and become resistive which results in heat. Further, if the heat rises sufficiently, the joint swill separate and a series-arc results. A person familiar with electricity and electrical circuits would appreciate that arc to ground happens when a conductor becomes too close to another grounded conductor, such as a metal PV module frame installed with a ground wire. A person familiar with PV DC electricity would appreciate that arcing in a PV module continues until the solar-generated energy is insufficient to jump the gap.

Figure 4:
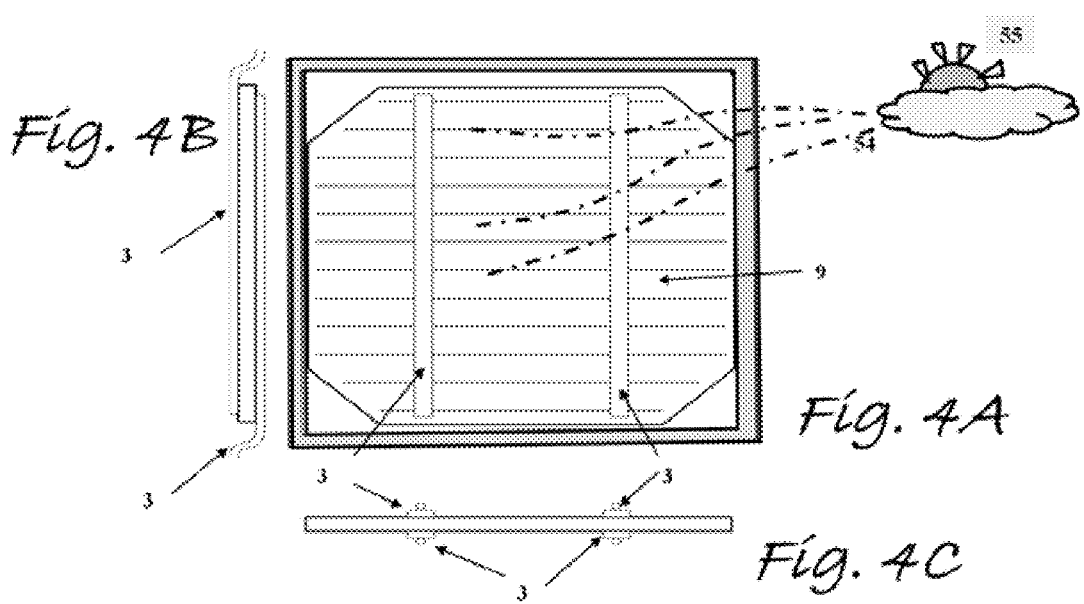
FIG. 4A is a 2-D orthogonal sketch of a PV Cell.
FIG. 4B is a 2-D sketch of a PV cell electrical bus seen from a side edge perspective.
FIG. 4C is a 2-D sketch of a PV cell electrical bus seen from a bottom edge perspective

Referring now to FIG. 4A, which shows a PV cell 9, with two electrical buses 3, and solar radiation 54 from the sun 55. The solar radiation 54 strikes the PV cell 9, which generates electrical current when connected in a circuit with the electrical bus 3.

Referring now to FIG. 4B. The electrical buses 3 collect energy on opposing sides of the PV cell 9 wherein one side is positive and the other is negative. A person familiar with electrical circuits would understand that heat is generated due to resistance of the metal used in the conductor and the solder.

Referring now to FIG. 4C, which shows a side view of the PV cell 9 with two electrical buses 3 on the top and two electrical buses 3 on the bottom. FIG. 4C depicts how the electrical buses 3 are soldered to the PV cell 9, alternating from top surface to bottom surface.

Figure 5:
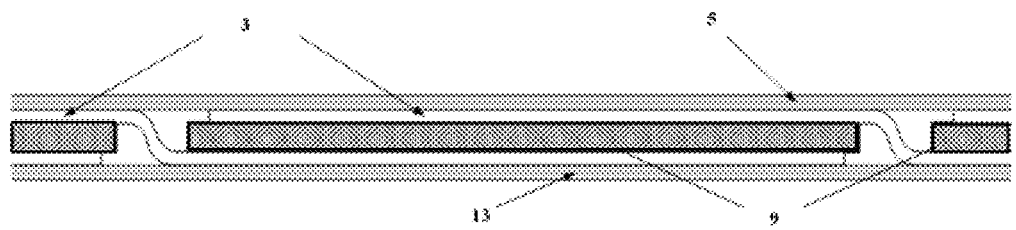
FIG. 5 is an edge view diagram of strips of electrical bus 3 on top and PV cells mounted on a support surface.

Referring now to FIG. 5, which is an edge view of a typical PV module construction which is not protected by the current invention. FIG. 5 shows diagrammatically lengths of electrical bus 3 in a pattern that alternates above and below PV cells 9. The assembly is mounted on a support surface 13. A protective glass 5 is on the upper side. The purpose of the glass is to protect the PV cells 9 from dirt, damage, moisture, and other factors that degrade their performance. The protective glass 5 also protects against inadvertent electrical shock. A person familiar with how PV cells are constructed would appreciate that electrical buses are of two types; one for electrical ground and the other current carrying.

Figure 6:
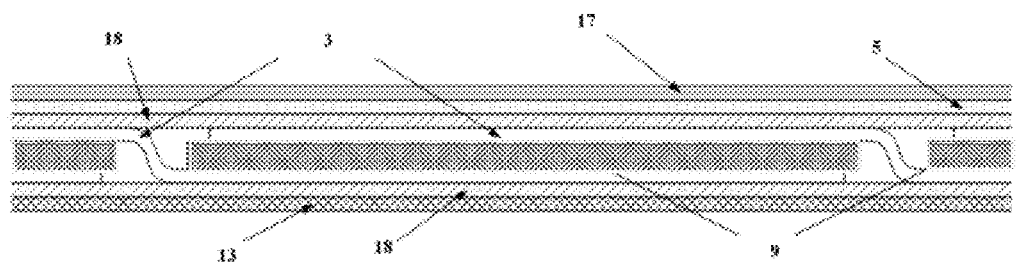
FIG. 6 is a side view of an alternative embodiment according to the teaching of this patent, showing how sensors can be installed for retrofit of existing PV modules.

Referring now to FIG. 6, which depicts a PV cell 9, sensor strands 17, support surface 13, elastomeric material 18, protective glass 5, and electrical bus 3.

Referring again to FIG. 6, a person experienced in the art of manufacturing, and in particular, retrofitting, would understand that a new piece of protective glass 5 with sensor strand 17 taped, glued, or embossed thereon at a factory, would possibly be more cost-effective than adding the strands manually. A person familiar with retrofitting would also appreciate that having sensor strands 17 on both surfaces would be effective in early detection of unsafe resistive heating at points along the length of the electrical bus 3.

Figure 7:
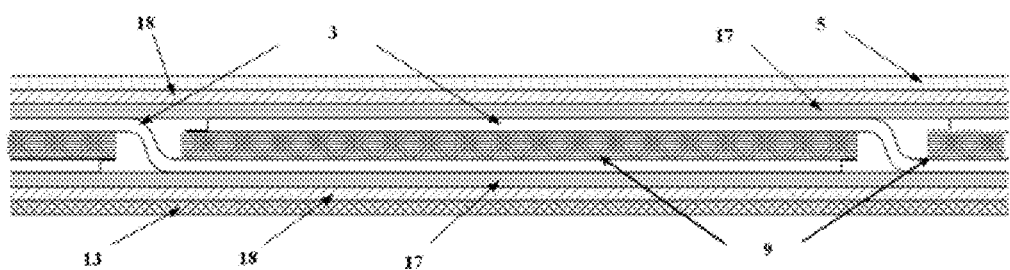
FIG. 7 is a side view of yet an alternative exemplary embodiment with construction for new manufacture PV modules.

Referring now to FIG. 7, which is a side view of an exemplary embodiment for installing sensors in proximity to an electrical bus during manufacture of PV modules. The items referenced by number are PV cell 9, sensors strands 17, support surface 13, and electrical bus 3.

Still referring to FIG. 7 the sensor strands 17 are constructed with a translucent core that can be glass, styrene, acrylic, or any composition that has appropriate characteristics such as, but not limited to, doping, melting point, stiffness, bend radius, cladding, or coating. Elastomeric material 18 can be used to adhere a sensor strand 17 proximal to an electrical bus 3 on the side exposed to solar radiation before covering with a sheet of protective glass 5. A same or similar technique using elastomeric material 18 on sensor strands 17 can be employed to adhere to the electrical bus 3 on the support surface 13 side of the PV cell 9.

Referring again to FIG. 7, a person familiar with the art of manufacturing of PV modules would appreciate that the sensor strands 17 would be arranged in an appropriate pattern, such as, but not limited to, proximity to each electrical bus 3 and also to points on the frame or elsewhere that a ground short or other unsafe condition might occur. According to the present invention, the arrangement would be optimal for detecting hot spots in the electrical bus, shorts to ground at the frame, and other unsafe conditions.

Figure 8:
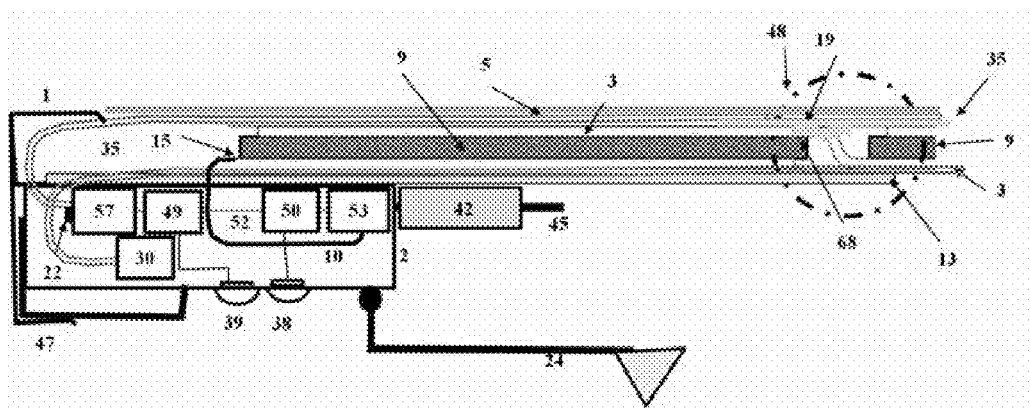
FIG. 8 is a detailed schematic drawing of potential arc spots in a cutaway side view of a portion of a PV module.

Referring now to FIG. 8, which shows a cutaway side view diagram of a PV module. The labeled items in this figure include a portion of the frame 1, clamp 47, protection box 2, electrical bus 3, DC output 45, bonding point 15, opaque-coated sensor 35 with melted sensor 19, protective glass 5, two PV cells 9, and support surface 13. Labeled items depicted inside the protection box 2 include: DC conductor 10, PV DC coupling 42, interrupter device 53, photodetector 57, light source 30, sensor coupling 22, opaque-coated sensor 35, an unsafe condition 48, melted sensor 19, and controller 49, unsafe condition indicator 38, protection active indicator 39, a switch 50, and latched semaphore 24.

Still referring to FIG. 8, the unsafe condition 48 is a hot spot caused by resistive heating at a point in the electrical bus 3. The hot spot could be due to, among other causes, a manufacturing defect, mechanical stress, contamination, or oxidation of solder, which increases resistance to current flow. As resistance increases, the heat generated eventually rises sufficiently to cause the translucent material in the sensor in proximity to change state by melting. The change of state can have at least two effects depending on the construction of the sensor strand 17; 1) solar radiation enters an opaquely-coated darkness sensor; 2) light ceases to flow in an illuminated sensor loop. The photodetector 57 detects the light from the light source 30 and generates a signal which is processed by the controller 49, which determines an unsafe condition and generates an unsafe condition signal causing the switch 50 to command the interrupter device 53 to open the DC circuit interrupting current flow within the PV module, pre-empting a DC arc at a future time. In addition, the switch 50 illuminates the unsafe condition indicator 38 and unlatches the latched semaphore 24, making the semaphore visible.

Referring again to FIG. 8, a person familiar with electrical safety would appreciate that when a DC arc happens in a PV system, the extremely hot plasma will ignite proximal combustible material. A person familiar with architecting, manufacturing, or installing PV systems would appreciate the present invention detecting the unsafe condition and opening the circuit is far more effective than allowing a DC arc to happen. Further, a person familiar with protection systems would appreciate that the present patent offers a major advantage by detecting unsafe conditions in addition to preventing fires due to arc-faults.

A person familiar with the state of the art of designing sensor systems would understand that PV system components could be configured with different embodiments that provide almost unlimited sensing and protection functions and options in an embodiment For example, the translucent media used to create the sensor can selected from materials such as, but not limited to, glass, silica, polypropylene, styrene, acrylic, or any media that has appropriate characteristics such as, but not limited to, doping, melting point, stiffness, bend radius, cladding, or coating. In addition, the features for control could be included in a chassis that is coupled to an existing junction box or a new protection box for retrofitting a legacy system component.

Figure 9:
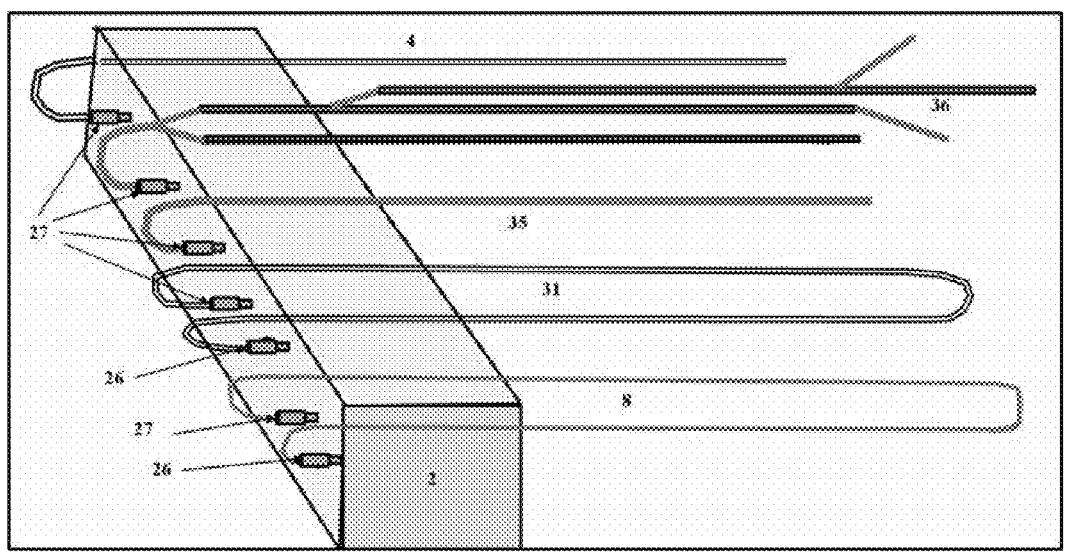
FIG. 9 is a perspective view drawing of several types of sensors coupled to a protection box constructed according to the present patent.

Referring now to FIG. 9, which is a perspective view drawing of several types of sensors coupled to a protection box 2 constructed according to the present patent. Shown in FIG. 9 are a translucent sensor 4, a branched darkness sensor 36, an opaque-coated sensor 35, a darkness sensor 31, a detector coupling 27, and a light source coupling 26.

Still referring to FIG. 9, the operational mode of the sensors is to guide light entering therein to a detector coupling 27 interfaced to a photodetector. The sensor could be made with an elastomeric material on the surface thereof for ease of placement in components of PV systems. The couplings that connect an end of a sensor should be selected for properties, such as but not limited to, being rugged and light-proof to avoid any stray light from causing a false alarm. Similarly, any coating for a sensor should be selected for properties, such as but not limited to, durability for the life expectancy of the PV module, opaqueness, or clarity. The translucent media used to construct a sensor can be glass, styrene, acrylic, or any composition that has appropriate characteristics such as, but not limited to, doping, melting point, stiffness, bend radius, cladding, or coating.

Again referring to FIG. 9, a translucent sensor 4 would have application in a dark space, such as under the electrical bus under photo cells to detect first light from an arc or break in the structure of a component of a PV system. A branched darkness sensor 36 has multiple strands that independently guide light and would be ideal for use in a dark space such as under the electrical buses in the underside of a PV module to detect first light of an arc or break in the dark understructure of a PV module. An opaque-coated sensor 35 would be ideal for use in a lit space on the upper side of a PV module to detect light of an arc or break in the top structure of a PV module exposed to light. A sensor loop 8, coated with an opaque substance, when coupled to a light source via a light source coupling 26 would useful for detecting parallel arcing, hot spots that melt the translucent media, damage from, but not limited to, hail stones, or breaking due to, but not limited to, the shock wave of a DC arc.

Referring again to FIG. 9, a person familiar with the art of using sensors would appreciate that sensors used in the present invention can be strips, strands, or pieces of opaquely coated or uncoated translucent media. Also, a person familiar with use of sensors would appreciate that the sensors can be used to determine hot spots or damage that indicate an unsafe condition in PV modules, PV wiring, combiners, inverters, buck or boost converters, AC distribution panels and other system components. In addition, an opaque coating can be any worthy media such as, but not limited to, a material that dissolves in water because water ingress though a leaking waterproof gasket is an unsafe condition.

Figure 10:
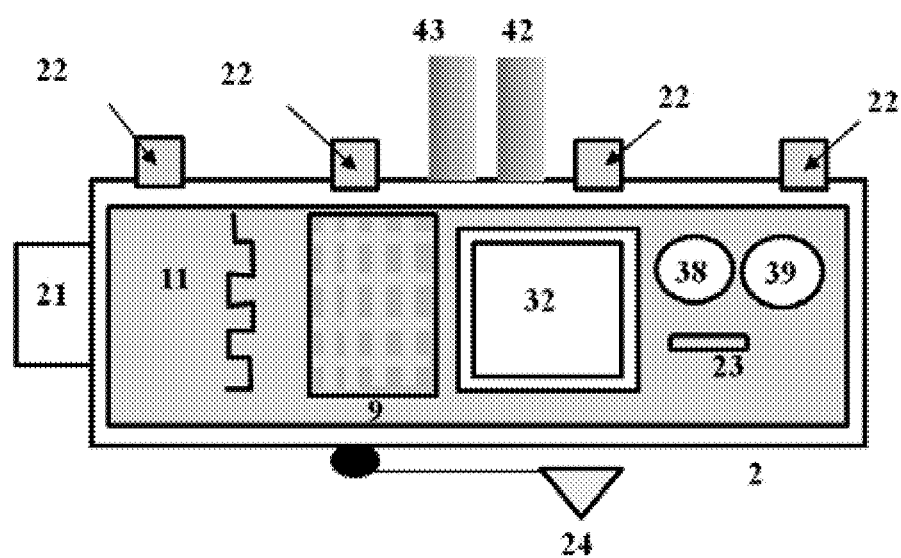
FIG. 10 is a schematic diagram of the exterior of a protection box constructed in an exemplary configuration of the current patent.

Referring now to FIG. 10, which is a schematic diagram of the exterior of an exemplary protection box, constructed according to the teaching of the present patent. The labeled items are the protection box 2, unsafe condition indicator 38, protection active indicator 39, RF antenna 11, PV cell 9, sensor couplings 22 connected to light source or photodetector by design. Power outlet coupling 21, latched semaphore 24, USB port 23, display 32, and power outlet coupler 21.

Referring again to FIG. 10, the respective end of a sensor mates to appropriate sensor coupling 22 that interfaces to either a light source or a photodetector in the protection box 2. The protection active indicator 39 informs that the protection system is active. The unsafe condition indicator 38 informs of an unsafe condition in the PV module or PV wire coupled to the power outlet coupling 21. PV ground coupling 43 and PV DC coupling 42 from the PV module provide optional auxiliary power to a DC power outlet coupling 21. A DC energy storage device can be charged by the PV cell 9 or by energy scavenged from the DC current produced by the PV module.

Referring yet again to FIG. 10, a person familiar with constructing sensors would appreciate that components, such as the light source and detectors, can be external to the protection box 2. Also that features such as an RF antenna 11 for wireless communication; a display 32 for messages; a latched semaphore 24 for visible indication of status at a distance; and a USB port 23 for coupling to USB compatible devices are not necessary for achieving protection. Further, a person familiar with the art of architecting a control system would appreciate that there is a wide range of commercial components available to implement the protection box described in the current patent. In addition, the features for control could be included in a chassis to be coupled to an existing junction box or an optional protection box for retrofitting a legacy PV module. A person familiar with protection systems would appreciate the present patent can be used to detect, mitigate, and annunciate unsafe conditions in potentially all complex PV system components and the present invention has wide application in other systems as well.

Figure 11:
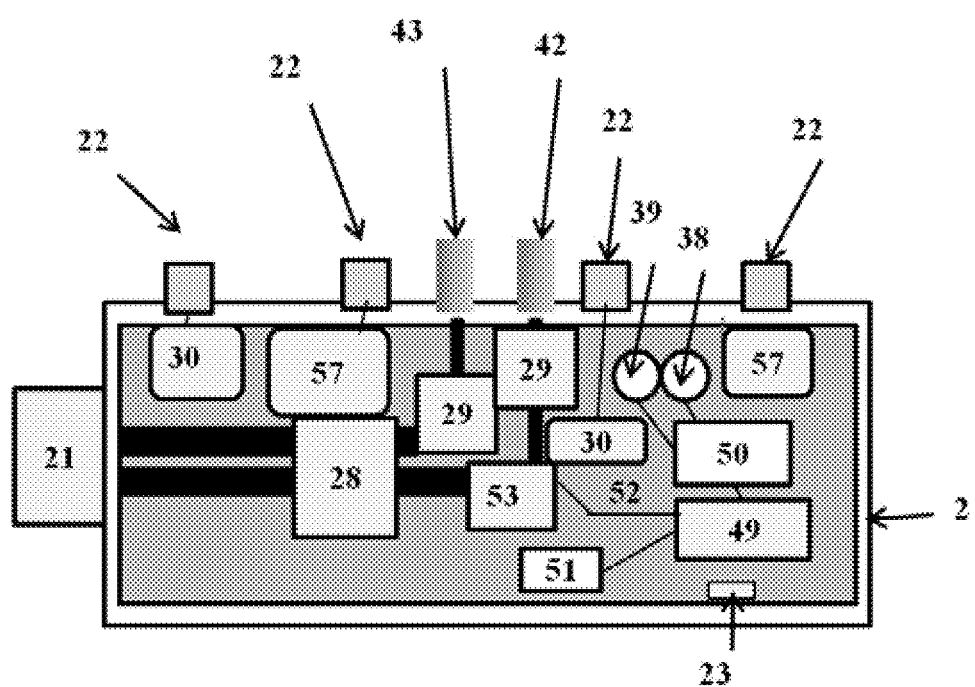
FIG. 11 is a schematic diagram of the interior of a protection box constructed in an exemplary configuration according to the present patent.

Referring now to FIG. 11, which is a diagram of an interior view of a protection box 2. The components in FIG. 11 include: protection box 2, power outlet coupling 21, USB port 23, sensor coupling 22, light source 30, PV DC coupling 42, PV ground coupling 43, unsafe condition indicator 38, protection active indicator 39, controller 49, switch 50, DC energy storage device 51, interrupter device 53, overheat sensor 28, diodes 29, and photodetector 57.

Still referring to FIG. 11, the protection box 2 is shown with a power outlet coupling 21 that connects the power produced by the PV module to the PV string, disconnect, or other PV system component. The sensor coupling 22 connects the end of a sensor to a respective photodetector 57, which receives light or directs light from a respective light source 30. The light source 30 produces light for illuminating a sensor, which could be for self-test or to determine if there is an unsafe condition. The current conductor coupling 33 accepts the appropriate end of the electrical bus from the PV module. The unsafe condition indicator 38 and protection active indicator 39 are informational.

Again referring to FIG. 11, the controller 49 can be of any type such as but not limited to a digital logic circuit, analog logic circuit, field programmable gate array, or microcircuit. The controller 49 can be powered by a DC energy storage device 51, which in turn is charged by DC power from the PV module. The controller 49 is configured with logic or programming for determining unsafe conditions. The controller 49 processes signal from the photodetector 57 to determine if there is an unsafe condition. The controller also illuminates the protection active indicator 39. If there is an unsafe condition, the controller 49 outputs an unsafe condition signal 52, which is received by the switch 50. On receiving an unsafe condition signal, the switch 50 sends an interrupt signal to the interrupter device 53 and also illuminates the unsafe condition indicator 38. The function of the interrupter device 53 is to open the PV module power circuit in such a manner it can only (in accordance with NEC code) be reset by manual intervention. The controller 49 is interfaced to the USB port 23 for functions such as, but not limited to, programming, data offload, and communication to compatible computing devices.

Referring again to FIG. 11, a person familiar with the art of electrical installations, such as, but not limited to, an architect, designer, or installer, would appreciate that the diagram in FIG. 11 is notional and for teaching how to implement the current invention, and that there is a wide range of commercial components available to implement the current patent. A person familiar with designing a protection system can configure the system with different embodiments that provide almost unlimited functions and options in an embodiment. The controller 49 can be interfaced to a USB port or wireless transceiver for functions such as, but not limited to, programming, data offload, and communication with compatible computing devices. In addition, a person familiar with the state of the art would understand that the features for control could be included in a chassis to be coupled to an existing junction box for retrofitting a legacy PV module.

Figure 12:
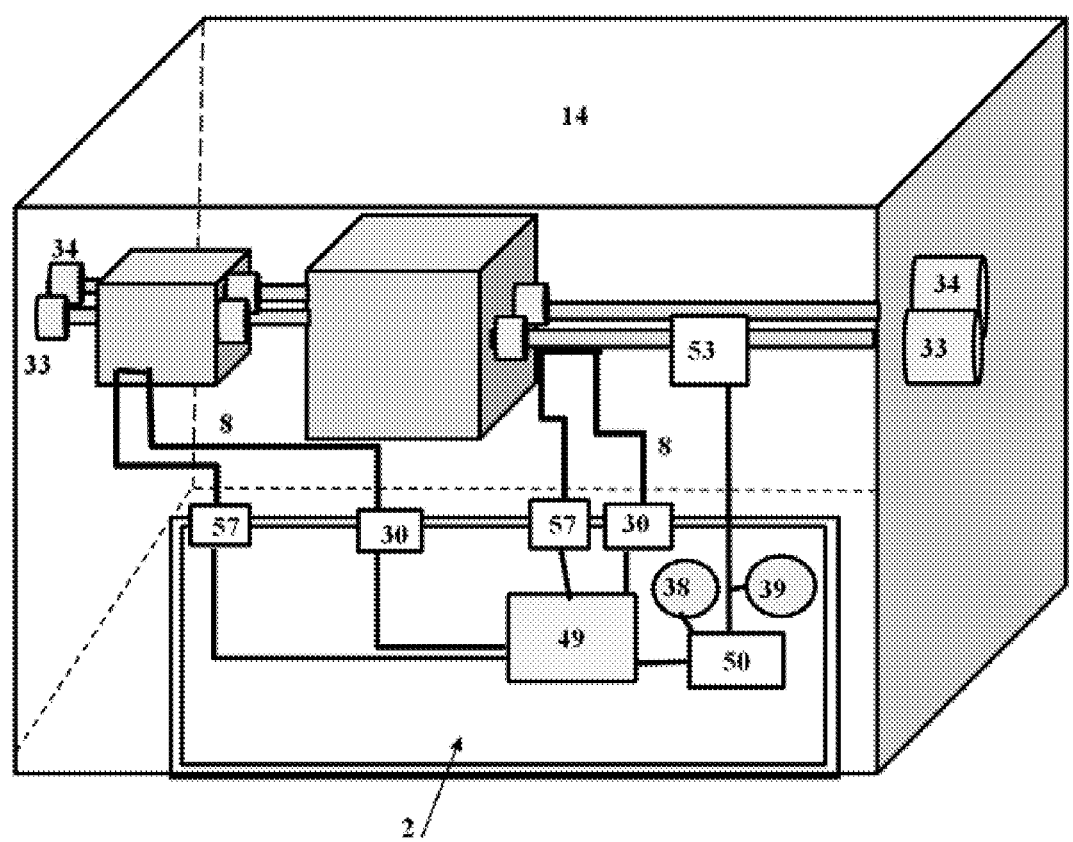
FIG. 12 is a diagram depicting the interior of a PV System component in an exemplary configuration according to the present patent.

Referring now to FIG. 12, the depicted system component could be a DC disconnect, a DC to DC booster, a DC power to a DC combiner, a DC power to a DC to AC inverter, an AC disconnect, an AC distribution panel, or other component that warrants monitoring for unsafe conditions. The components labeled in FIG. 12 are: system component 14, sensor loops 8, light source 30, photodetectors 57, current conductor coupling 33, ground conductor coupling 34, unsafe condition indicator 38, protection active indicator 39, controller 49, switch 50, and interrupter device 53.

Still referring to FIG. 12, the light source 30 produces light for illuminating a sensor. The unsafe condition indicator 38 and protection active indicator 39 are informational. The controller 49 can be powered by DC power from the within the system component 14. The controller 49 can be configured with analog logic, digital logic, rule-based machine reasoning, or computer programming to determining unsafe conditions and provide functions for other purposes. The controller 49 can be of any type such as but not limited to a digital logic circuit, analog logic circuit, field programmable gate array, a microcontroller, or application specific integrated circuit (ASIC). The controller 49 processes a signal from one or more photodetectors 57 to determine if there is an unsafe condition. The controller also illuminates the protection active indicator 39. If there is an unsafe condition, the controller 49 outputs an unsafe condition signal, which is received by switch 50. On receiving an unsafe condition signal, the switch 50 sends an interrupt signal and also illuminates the unsafe condition indicator 38. On receiving an interrupt signal, the interrupter device 53 safes the flow of current power circuit.

Referring again to FIG. 12, a person familiar with the art of electrical systems, such as, but not limited to, an architect, designer, or installer, would appreciate that the diagram in FIG. 12 is notional for teaching how to implement the current invention, however, there is a wide range of commercial components available to implement the current patent. For example, a designer would realize that depending on the design of the system component it might be necessary to shunt the electrical power to ground or to open the circuit with the interrupter device 53 design. The controller 49 can interfaced to a USB Port or wireless transceiver for functions such as, but not limited to, programming, data offload, and communication with compatible computing devices. A person familiar with the state of the art would understand that individual system components could be configured with different embodiments that provide almost unlimited sensing and protection functions and options in an embodiment. In addition, the features for control could be included in a chassis to be coupled to an existing junction box for retrofitting a legacy system component.

Figure 13:
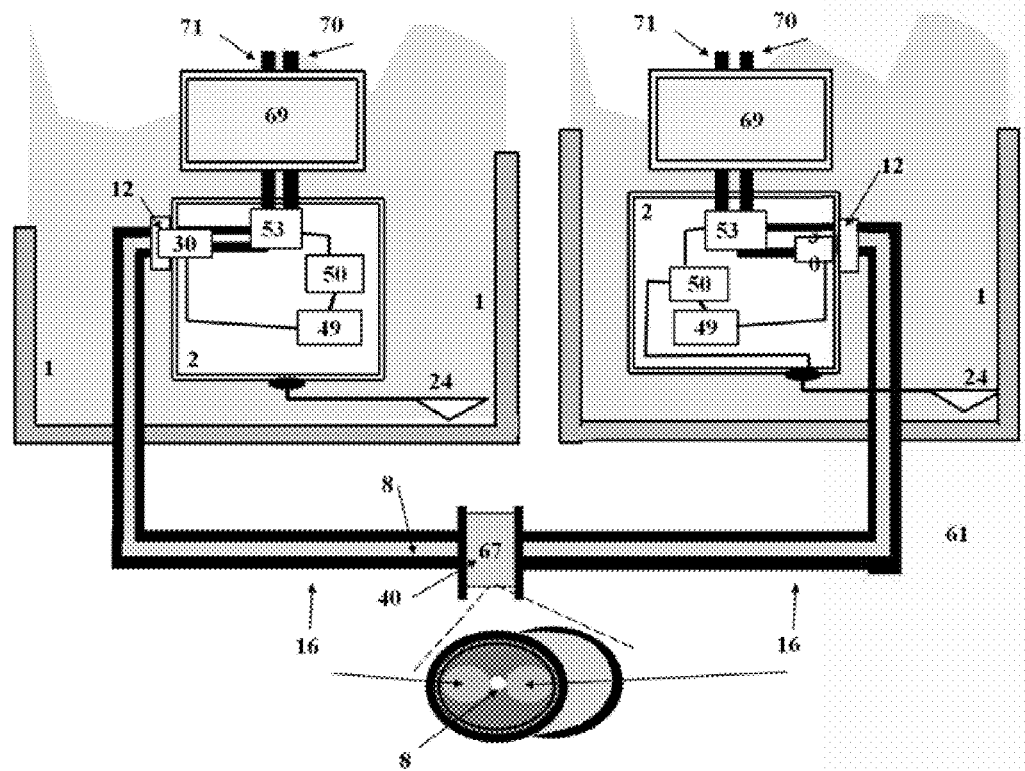
FIG. 13 is a diagram depicting a preferred embodiment of the protection system to protect from unsafe conditions in a coupling used to serially connect wiring output from two PV modules.

Referring now to FIG. 13, the depicted system components are PV module frame 1, PV module junction box 69, current conductor coupling 70, ground conductor coupling 71, protection box 2, sensor loop 8, output cable connector 12, PV wiring 16, light source 30, power connector 67, potential hazard point 40, controller 49, switch 50, photodetector 57, and latched semaphore 24.

Still referring to FIG. 13, the focus of this figure is to teach how a sensor loop 8 contained within PV wiring 16, can detect an unsafe condition of heat from a poor connection or light from an arc within the power connector 67, as well as damage to the PV wiring 16. The light source 30 produces light for illuminating a sensor. The controller 49 can be powered within the protection box 2. The controller 49 is configured with logic or programming for, but not limited to, determining unsafe conditions. The controller 49 processes signal from the photodetector 57 to determine if there is an unsafe condition. If there is an unsafe condition, the controller 49 outputs an unsafe condition signal, which is received by the switch 50. On receiving an unsafe condition signal, the switch 50 generates an interrupt signal to the interrupter device 53. On receiving an interrupt signal, the interrupter device 53 stops the flow of current in the PV module 61 or the PV wiring 16.

Referring again to FIG. 13, a person familiar with the art of electrical systems, such as, but not limited to, an architect, designer, or installer, would appreciate that the diagram in FIG. 13 is notional for teaching how to implement the current invention to protect against unsafe conditions in wiring and connectors. A person familiar with the state of the art would understand that individual system components can be configured with different embodiments that provide almost unlimited sensing and protection functions and options in an embodiment.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

DETAILED DESCRIPTION OF THE INVENTION

The following is a detailed description describing exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the figures and description are provided in order to provide a thorough understanding of the invention and how to practice the invention. However, the invention may be practiced according to the claims without some or all of these specific details. For the purpose of clarity, technical material that is known in the technical fields related to the invention has not been described in detail so that the invention is not unnecessarily obscured. References are cited that provide detailed information about electrical systems, unsafe conditions of electrical systems, and approved techniques for implementing protection systems.

The embodiments of the invention set forth herein relate to detection, mitigation and isolation of an unsafe PV module and associated wiring that incorporates the present invention; and a control system that employs machine logic or computer programmed algorithms for purposes of properly shutting down an unsafe PV module while maintaining healthy sub-arrays and PV strings.

Embodiments of the invention thus provide a PV module that incorporates digital or analog controller using data from one or more photosensors, each coupled to one or more translucent sensors; and coupled to an interrupter device for isolation of the unsafe condition of the PV module and associated connections. Additionally, a control system that employs logic for purposes of proper shut down of an unsafe PV module clearing faults and restoring a PV module found healthy on inspection to service.

A technical contribution for the disclosed protection system is that it provides for unique autonomous detection of unsafe conditions at intersections of conductors of a PV module, properly taking the unsafe PV module offline, and after clearing faults, restoring the healthy PV module to service. An interrupter device, switch, and controller are incorporated into the apparatus for enabling such functioning.

An exemplary embodiment of the present invention is for providing protection from unsafe conditions in a PV module. This embodiment includes at least one sensor configured to generate comprehensive monitoring of the electrical buses and places where unsafe conditions could result. In particular, to detect unsafe conditions that, left unattended, could result in a DC arc or ground fault and the consequential damages thereto. This embodiment also includes one or more photodetectors positioned and corresponding to each of one or a plurality of translucent sensors with each photodetector coupled to at least one controller that determines unsafe conditions and on determining an unsafe condition outputs an unsafe condition signal. This embodiment further includes an interrupter device that, on receiving an unsafe condition signal, has contacts that operate between a closed position permitting current flow; and an open position. This embodiment also includes the ability to deal with a situation with actual DC arcing and ground faults when they occur; having the design of the interrupter such that it properly reacts to the situation by: 1) isolating the component by opening the unsafe circuit if the situation is a series arc; or 2) short-circuiting the PV module or PV cell string if the situation is a parallel or ground fault.

In yet another embodiment, the controller is configured to: 1) receive voltage and current data from respective photodetectors interfaced with sensors; 2) infer an unsafe condition by observing significant change in voltage and current data from the respective photodetectors; and 3) output an unsafe condition signal which causes the interrupter to isolate the respective electrical circuit by causing the associated circuit to open and remain open when an unsafe condition is detected. In addition, the interrupter can also be configured to cause the circuit to reset to a closed position so as to clear the detection of an unsafe condition when no unsafe condition is confirmed by certified inspection, or the unsafe condition is corrected.

According to yet another embodiment of the present invention, a method of detecting an unsafe condition includes analog or digital comparison of voltage and current data from the photodetectors against threshold settings. On detecting the exceedence of a threshold value, the controller initiates operation of the associated interrupter device in order to isolate that portion of the PV system associated with the unsafe condition. The step of controlling operation of the interrupter device further includes causing the circuit to open and remain open on the circuit of the PV system component wherein an unsafe condition is detected. The controller is also able to be configured to cause the circuit to complete when no unsafe condition is confirmed by certified inspection, so as to clear the unsafe condition.

According to yet another embodiment of the present invention, the controller is capable of detecting an unsafe condition when a sensor is damaged, such as by heat and plasma of a parallel arc, by the controller using analog or digital comparison of voltage and current data from photodetectors that measure intensity of light coming from sensors purposely positioned to detect a parallel arc against a threshold setting. On detecting the exceedence of the threshold, the controller sends an unsafe condition signal, which causes the interrupter device to isolate the PV system component. The step of controlling the operation of the interrupter device further includes causing the unsafe circuit to open and remain open. The controller is also able to be configured to cause the interrupter device to connect the circuit again when no unsafe condition is confirmed by certified inspection, so as to clear the unsafe condition.

According to yet another embodiment of the present invention, the controller is able to alert an unsafe condition by one or more actions including, but not limited to, lighting a lamp located on the protection box; lighting a lamp located on the component; and sending an alert signal over a wired or wireless data link, a dedicated wire, telephony, a radio link, and sending a wireless message.

In a broad embodiment, the present invention extends to use in other equipment, which is subject risk of damage, fire, and loss of property due to aging and manufacturing defects.

Preferred Embodiment

A best embodiment will provide effective protection as well as warning of unsafe conditions that, unattended, could result in catastrophic damage and injury. In a best embodiment, sensors are constructed with translucent polymeric or glass fibers selected for properties that will optimize detection of unsafe conditions, such as, but not limited to, physical change such as melting above a certain temperature. The sensors are configured for use in darkened or lightened conditions and are respectively placed in or on PV system components and interconnection cabling where unsafe conditions could occur. The sensors can be branched, single, or looped as described in the current patent and the drawings. If the sensor is configured as a loop sensor, a periodic light signal is passed from one end through the translucent media to a photodetector at the other end to verify the integrity of the system. If there is a hot spot, abrasion, or other damage leading to or caused by an unsafe condition of the PV system component or interconnection cabling, the sensor will be melted, burned, blasted or cut and the photonic signal does not reach the photodetector resulting in the electrical system being disconnected before an arc-fault or other catastrophic event happens. If the sensor is not configured as a loop sensor, the controller to which the photodetector is interfaced will: 1) determine there is not an unsafe condition; 2) light is present when no light is appropriate determines an unsafe condition; or 3) when light is appropriate and there is a change in light characteristics, which determines an unsafe condition. The algorithm used by the controller to determine an unsafe condition can be tuned by training with examples or adjusting the sensor material, geometry, and layout. The light signal should also be provided at an appropriate rate, so there is only a short delay in the determination process. Since the sensor is intended to be incorporated in the modules and electrical cabling during the manufacturing process, the best embodiment is simple and easily incorporated into automated manufacturing of the PV system component.

For example, in the case of manufacturing a PV module, the sensors, constructed with, but not limited to, polymer or glass would be deposited by an automated process onto or around the conductors connecting the PV cells of a PV module so the sensors are proximal to the electrical current conductors, between conductors of opposite polarity, and proximal to the frame. Similarly the sensors would be deposited on the PV cell side of the plastic sheeting used to electrically insulate the underside of the array of solar cells.

For example, in the case of manufacturing a PV system component such as a DC to AC inverter, the sensors would be placed proximal to components and wiring therein that could have an unsafe condition as well as to detect ingress of water or rodents or other instances that would cause an unsafe condition. As with the teaching about use with a PV module immediately above, the controller would generate an unsafe condition signal that raises an alarm and the interrupter device would interrupt current flow by opening a circuit or short-circuiting power as appropriate to mitigate the unsafe condition.

Operation of the Preferred Embodiment

In a preferred embodiment, the system operates by pairing translucent sensors in proximity with electrical circuitry so that any external abrasion to the system or internal heating causes the intensity of light to the photodetector to fail or detectably degrade. A continuous light beam or periodic pulse of light is sent through the optical path using a phototransmitter-photodetector pair. If the photodetector does not detect the illumination, the output from the photodetector will stop, causing the controller to send an unsafe condition signal, which results in an alarm and the PV system component being de-energized.

Reduction to Practice

The present invention for a self-protecting system for PV modules and other applications was the result of a failed attempt by Management Sciences, Inc. in a 2012 Sandia National Laboratory-funded contract to utilize Furse and Blemel's U.S. Pat. No. 6,937,944, for a frequency domain reflectometer (FDR) to detect DC arc-faults in PV module electrical buses and associated wiring.

In fall 2012 Sandia Laboratory was enlisted by Management Sciences, Inc. to explore whether melting of translucent sensors could be applied successfully to detect arc-faults in PV modules. The concept being that in the event of hot spots, which are believed to precede arc-faults, an illuminated proximal translucent polymer strand coupled to a photodetector would melt and the light signal would not reach the photodetector causing a logic circuit to signal an interrupter device to open the PV module output circuit and stop the flow of current.

A number of integrated samples were created to demonstrate the system results when there was an arc-fault in the PV system. These samples simulated two types of series arc-faults inside a PV module and an arc-fault from a PV cell to the module frame. The arc-faults created enough heat and localized pressure to sever the fiber optic connection and sound the alarm. This was demonstrated to be an effective alternative to using the electrical signal-based AFCIs when the fiber optic is located close to the arc-fault The components that comprise the invention were developed and reduced to practice in 2013. Prototype sensors were built using translucent acrylic polymer. The efficacy of the sensors was subsequently tested by Sandia National Laboratory experts in April through September 2013. Sandia National Laboratory photovoltaic system research engineers created an apparatus for introducing three arc-faults in different configurations found in PV systems. The apparatus was used with the prototype of the integrated fiber optic system to determine the performance in realistic conditions. Sandia Laboratory engineers reported the fiber optic cable was broken and the system annunciated the fault. Details of the apparatus and testing during reduction practice are presented in Sandia report SAND2013-1185, "Preliminary Photovoltaic Arc-Fault Prognostic Tests using Sacrificial Fiber Optic Cabling" which is listed as #1 in the LIST OF OTHER PUBLICATIONS and is incorporated in its entirety by reference.

CONCLUSIONS, RAMIFICATIONS, AND SCOPE

The present invention has been described in terms of the preferred embodiment, and it is recognized that equivalents, alternatives, and modifications, aside from those expressly stated, are possible and within the scope of the appending claims.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The previous description of specific embodiments is provided to enable any person skilled in the art to make or use the present invention. The various modifications to these embodiments will be readily apparent to those skilled in the art, and the generic principles defined herein may be applied to other embodiments without the use of the inventive faculty. For example, each self-protecting PV module can include different arrangements of sensors depending on the functionality required. The embodiments presented in this application focus on preventing arc-faults in PV power systems, but can be applied in any situation, such as aircraft, where arc-faults can result in loss of human life and destruction of property. Thus, the present invention is not intended to be limited to the embodiments shown herein, but is to be accorded the widest scope consistent with the principles and novel features disclosed herein and as defined by the following claims.

What is claimed is:

1. A system for providing protection from unsafe conditions in an electrical power system comprising:
   at least one light sensor configured to accept light from a non-arc source and generate a threshold signal indicative of the accepted light;
   a controller in communication with said at least one light sensor, the controller being configured to process the threshold signal to determine the existence of an unsafe condition, and generate an unsafe condition signal;
   an interruption device in communication with the controller, the interruption device being configured to interrupt flow of electrical current in response to the existence of an unsafe condition signal.

2. The system of claim 1, wherein the electrical power system is a photovoltaic electric power generating system.

3. The system of claim 1, wherein the electrical power system is a non-photovoltaic electric power generating system.

4. The system of claim 1, wherein the unsafe condition is a fire.

5. The system of claim 1, wherein the unsafe condition is an elevated temperature.

6. The system of claim 1, wherein the sensors include non-translucent devices.

7. The system of claim 1, wherein the sensor includes a plethora of translucent media.

8. The system of claim 1, wherein the controller is configured to determine a probability of an unsafe condition based on a first light signal.

9. The system of claim 1, wherein the controller is further configured to: determine a second light signature for a subsequent light signal; compare the second light signature to the first light signature; and based on the comparison, determine whether the subsequent light signal is indicative of an unsafe condition.

10. The controller of claim 1 further comprising using measurements of current and voltage to further characterize unsafe conditions.

11. The electrical power system of claim 1, which is an alternative energy system.

12. The system of claim 1, wherein the controller is configured to compare the determined characteristic to a probability of unsafe condition criterion to determine whether the light signal is indicative of an unsafe condition.

13. The system of claim 12, wherein the characteristic includes a plurality of characteristics including type of sensor and a magnitude of light intensity.

14. The system of claim 12, wherein the controller is further configured to adaptively adjust the unsafe condition criterion in response to a changed condition of the protection system or a changed configuration of a system component protected by the protection system.

15. A system that provides protection from unsafe conditions, comprising:
  one or more sensors configured to measure light and generate a first light signal indicative of the measurement of light; the light sensor further configured to measure a second light from a second fusible translucent media and generate a second light signal indicative of the measurement of said second light;
  a controller in communication with one or more said sensors, the controller being configured to: determine an intensity of unsafe condition based on the first light signal, verify the said intensity of unsafe condition based on light from an induced event, the verification including an error signal that is generated if the induced unsafe condition event is determined to be an unsafe condition event based on the unsafe condition detection algorithm; and determine whether the second light signal is indicative of an unsafe condition based on the unsafe condition detection algorithm and generate an unsafe condition signal if the controller determines that the second signal is indicative of an unsafe condition event;
  a circuit interruption device in communication with the controller; and
  an interruption device configured to mitigate the unsafe condition in response an unsafe condition signal.

16. The system of claim 15 further comprising an input device configured to selectively cause the controller to determine the unsafe condition detection algorithm, verify the unsafe condition detection algorithm, or determine whether the second light signal is indicative of an unsafe condition event.

17. The system of claim 15, wherein the unsafe condition detection algorithm includes a probability of unsafe condition calculation.

18. The system of claim 15, wherein the unsafe condition detection algorithm includes a comparison of the first light signature corresponding to the first light signal and a second light signature corresponding to the second light signal.

19. The system of claim 15, wherein a sensor is configured to detect the first unsafe condition event and the second light event, the first light signal and the second light signal being indicative of the fire is caused by an arc-fault detected by the light sensor for the first light event and fire detected by the second light event, respectively.

20. The system of claim 15, wherein the unsafe condition detection algorithm is configured to detect the first light event as light from an unsafe condition.

21. The system of claim 15, wherein the unsafe condition is communicated to at least one organization.

22. The controller of claim 15 further comprising using measurements of current and voltage to further characterize unsafe conditions.

23. A method for adaptively identifying a precursor to an unsafe condition in an electrical system, the method comprising:
  operating the electrical system to generate a first light event triggered by an unsafe condition event; detecting the first light event with a sensor;
  generating a first light signal indicative of the detected first light event; processing, using a controller, the first light signal to determine criteria of a precursor to an unsafe condition;
  operating the electrical system to generate a second light event; detecting the second light event with the light sensor; generating a second light signal indicative of the second light event;
  processing the second light signal to determine a characteristic of the second light signal and comparing the characteristic to the precursor to an unsafe condition criteria to determine whether the second light signal is indicative of a precursor to an unsafe condition event.

24. The method of claim 23, wherein the characteristic of the second light signal includes one or more of a magnitude of light intensity, a rate of change of an intensity magnitude, a frequency, a wavelength, a duration, or a direction or angle of incidence of light incident on the light sensor.

25. The method of claim 23, wherein the criteria includes one or more of a threshold value, a range of threshold values, or a predetermined light signature.

26. The method of claim 23 further comprising receiving from an input device an input indicative of the source of the first light event.

27. The method of claim 23 further comprising storing information about the second light signal in a memory if the second light signal is determined not to be indicative of an unsafe condition.

28. The method of claim 23, wherein the first light signal and second light signal include information concerning voltage and or current associated with said first light signal and or second light signal.

* * * * *